(12) United States Patent
Gillessen et al.

(10) Patent No.: US 9,469,052 B2
(45) Date of Patent: Oct. 18, 2016

(54) METHOD AND APPARATUS FOR PRODUCING A FIBER-REINFORCED PLASTICS CASTING

(71) Applicant: Airbus Operations GmbH, Hamburg (DE)

(72) Inventors: Alexander Gillessen, Stade (DE); Johannes Born, Bremen (DE); Sascha Backhaus, Hamburg (DE); Joachim Piepenbrock, Buxtehude (DE)

(73) Assignee: Airbus Operations GmbH (DE)

( * ) Notice: Subject to any disclaimer, the term of this patent is extended or adjusted under 35 U.S.C. 154(b) by 248 days.

(21) Appl. No.: 14/248,508

(22) Filed: Apr. 9, 2014

(65) Prior Publication Data

US 2014/0306372 A1    Oct. 16, 2014

(30) Foreign Application Priority Data

Apr. 11, 2013   (EP) ..................... 13163298

(51) Int. Cl.
*B29C 33/38* (2006.01)
*B29C 70/36* (2006.01)
*B29C 70/54* (2006.01)

(52) U.S. Cl.
CPC ........... *B29C 33/38* (2013.01); *B29C 33/3807* (2013.01); *B29C 70/36* (2013.01); *B29C 70/542* (2013.01)

(58) Field of Classification Search
CPC ... B29C 33/3807; B29C 70/36; B29C 33/38; B29C 70/542
See application file for complete search history.

(56) References Cited

U.S. PATENT DOCUMENTS

| | | | |
|---|---|---|---|
| 2,742,682 A * | 4/1956 | Payne | B22C 11/08 164/168 |
| 2,882,569 A * | 4/1959 | Blackburn | B22C 9/123 164/16 |
| 3,216,074 A * | 11/1965 | Harrison | B22C 7/00 164/146 |
| 3,739,834 A * | 6/1973 | Woonton | B22C 5/00 164/18 |
| 4,889,177 A | 12/1989 | Charbonnier et al. | |
| 6,344,160 B1 * | 2/2002 | Holtzberg | B29C 33/38 264/102 |
| 2003/0168775 A1 | 9/2003 | Eberth et al. | |
| 2005/0156361 A1* | 7/2005 | Holowczak | B28B 7/342 264/603 |
| 2007/0182071 A1* | 8/2007 | Sekido | B29C 33/0066 264/511 |
| 2010/0148393 A1 | 6/2010 | Carrillo | |
| 2011/0115124 A1 | 5/2011 | Barlag | |

FOREIGN PATENT DOCUMENTS

DE    10 2010 041377 A1   3/2012
EP         0 296 074 A1   12/1988
(Continued)

OTHER PUBLICATIONS

European Search Report (EP 13 16 3298) dated Sep. 25, 2013.
(Continued)

*Primary Examiner* — Matthew Daniels
(74) *Attorney, Agent, or Firm* — Lerner, David, Littenberg, Krumholz & Mentlik, LLP

(57) ABSTRACT

An apparatus and method for producing a fiber-reinforced plastics casting (FRP), includes a molding box filled with free flowing molding material, in what a prototype of casting or a textile preform is inserted, forming a mold cavity for infiltration the inserted preform of textile with synthetic resin material in order to form a fiber-reinforced plastics casting (FRP).

8 Claims, 1 Drawing Sheet

(56) References Cited

FOREIGN PATENT DOCUMENTS

| WO | 00/35648 A1 | 6/2000 |
| WO | 2009-124724 A1 | 10/2009 |

OTHER PUBLICATIONS

EP 14 163 286.9—Article 94(3) EPC dated Oct. 29, 2015.
EP 13 163 298.6—Article 94(3) EPC dated Oct. 29, 2015.

* cited by examiner

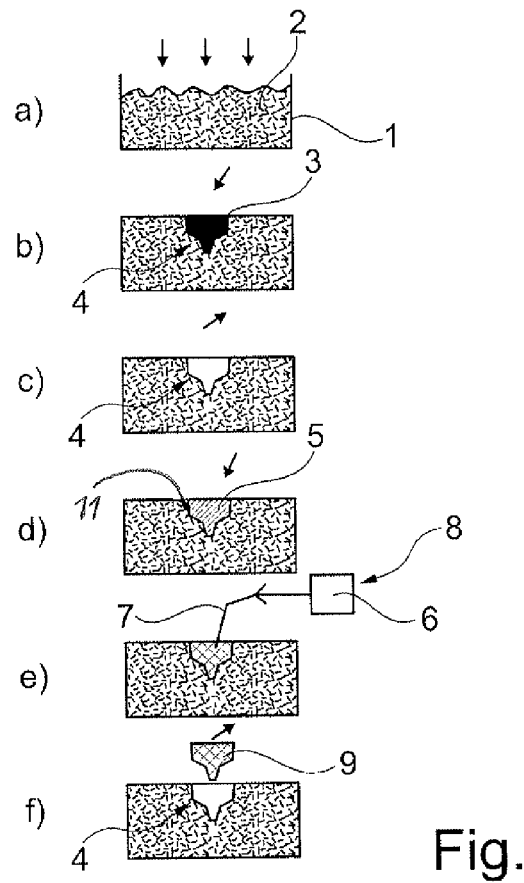
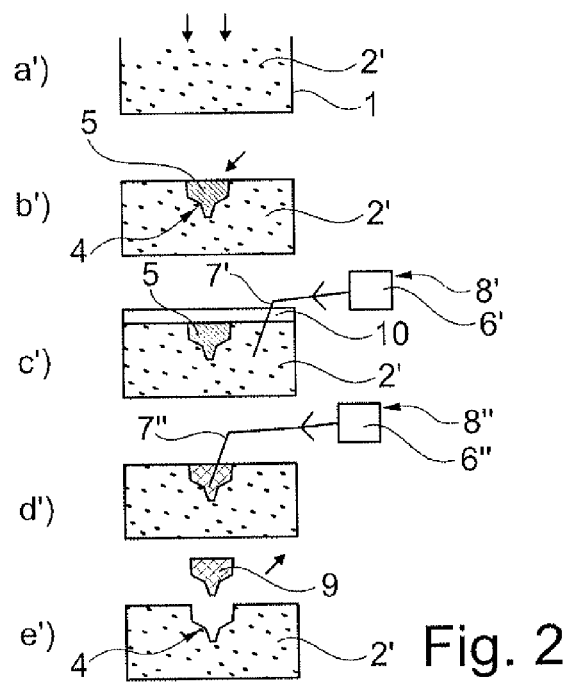
Fig. 1
Fig. 2

METHOD AND APPARATUS FOR PRODUCING A FIBER-REINFORCED PLASTICS CASTING

FIELD OF THE INVENTION

The invention relates to a method for producing a fiber-reinforced plastics casting. The invention further relates to an apparatus for producing such a fiber-reinforced plastics casting by means of a mould.

The invention concerns to the technical field of highly industrialized manufacturing of fiber-reinforced plastics casting (FRP), preferably used to manufacture aircraft parts with high geometrical variance. It also offers the possibility to make FRP production feasible for high automation and high series production in any FRP application field.

BACKGROUND OF THE INVENTION

For producing fiber-reinforced plastics casting usually solid, massive and non-flexible moulds are used. The moulds mostly consist of metal material.

The WO 2009-124724 A1 discloses a method for production of a fiber-reinforced plastics part from rovings by means of a mould. Said method comprises the following steps:
(a) rovings formed from dry fibers are applied to a mould surface by stretching the rovings,
(b) resin material is applied to the stretched rovings;
(c) the arrangement of fiber strands and resin material is consolidated by applying temperature and pressure such that a preform for the part to be produced is formed,
(d) the preform is detached from the deflection devices and is removed from the mould,
(e) once the preform has been detached from the deflection device, an injection process is carried out in order to form the fiber-reinforced plastics casting.

Due to the many production steps and the special rovings techniques this technical solution is limited to special formed castings.

The US 2003/0168775 A1 discloses another solution in which a fiber textile semi-finished material (preform) is fed directly and reformed onto a carrier and reforming tool, where it is fixed with a resin material as a binder. A carrier has a counter matching the negative or positive shape of the final required geometry of the preform that is to be fabricated. The reformed semi-finished article fixed with the binder is removed from the carrier to provide the preform. Several preforms of different cross-sectional shapes are jointed together, compacted to form a dense component having nearly the required finished contour, impregnated with a matrix system including a curable adhesive synthetic resin and then cured under an elevated temperature and/or pressure.

The result is a finished fiber-reinforced plastics casting such as an aircraft window frame or the like. This method is carried out on an apparatus including the rotating carrier and reforming tool which may have a cylindrical and/or manual surface to receiving and reforming the material. However, the apparatus for producing the fiber-reinforced plastics casting causes a high effort.

BRIEF SUMMARY OF THE INVENTION

An aspect of the present invention provides a method and apparatus for producing a fiber-reinforced plastics casting with high geometric variance and complex shapes with a low technical effort.

The invention encompasses the technical teaching according to which the manufacturing process of a fiber-reinforced plastics casting comprises the following steps:
filling and pressing a free flowing fine-grained moulding material for casting into an open moulding box;
inserting a prototype of casting in the precompressed moulding material in order to form a mould cavity;
removing of the prototype of casting from the mould cavity and inserting a textile preform in the mould cavity;
infiltrating the textile preform with synthetic resin material in order to form a fiber-reinforced plastics casting (FRP);
demoulding the plastics casting after curing of the resin material.

According to another feature of the invention more moulding material will be filled in the moulding box after the textile preform is inserted into the mould cavity in order to cover the moulding cavity. Thus, the FRP is completely surrounded from moulding material in order to avoid additional re-working effort.

Preferably, an infiltration conduit of a resin infiltrated device will be connected to the mould cavity after inserting the textile preform in the mould cavity for infiltrating the textile preform with a synthetic resin material in order to facilitate the infiltrating process.

The invention also encompasses the technical teaching according to which the following alternative manufacturing steps are carried out using the same moulding principle:
filling a free flowing coarse-grained moulding material for casting into an open moulding box;
inserting a textile preform in the moulding material in order to form a moulding cavity;
infiltrating the moulding material with high viscosity synthetic resin material in order to form a durable mould and curing the resin material;
infiltrating the textile preform with low viscosity synthetic resin material in order to form a fiber-reinforced plastics casting (FRP);
demoulding the cured moulding material after curing of the low viscosity resin material in order to separate the plastics casting.

Each pellet has defined a release property so that it can be released from the mould polymer after the process is finished. The pellet size is defined such as it can form the outer contour of the manufactured part properly.

Preferably, after inserting the textile preform in the moulding material an infiltration conduit of a high viscosity resin infiltrator device will be connected for infiltrating the moulding material with high viscosity synthetic resin material. For infiltrating the textile preform with low viscosity synthetic resin material another infiltration conduit of a low viscosity resin infiltrator device will be connected to the mould cavity after curing the resin material of the moulding material.

Preferably, the prototype of casting for forming the moulding cavity consists of a plastics material manufactured by a rapid prototyping process. Alternatively, it is possible to use a simple stamp or the like in order to form the moulding cavity into the pre-compressed moulding material.

In view of the two alternative methods as described above the general idea of the disclosure is to manufacture the mould for infiltration a pre-produced preform with synthetic resin material in-process in analogy to the classical metal dead moulded casting process. A basis for the mould is a free flowing moulding material of fine grained particles, especially sand, which can be used for the first method as described above. For the second method the free flowing moulding material preferably consists of coarse-grained elements, such as pellets. The pellets material has release properties. The mould for the second method as described above is created by infiltrating the pellets with a specific high viscosity resin material in order to prevent a flow of the said resin material into the area of the textile preform. This can be reached in that the moulding material comprises a higher flow resistance than the flow resistance of the textile preform inserted in the mould cavity.

The first method describes a two-step-process. The second method describes a kind of twin-filtration-process. For the said twin-filtration-process two different synthetic resin materials are necessary having a low and a high viscosity respectively.

The handling-stiffly textile preform preferably consists of glass or carbon fiber material. It is possible to use short, long or endless fibers for the textile preform. Preferably, the carbon fiber preform is embedded in a cover foil. The cover foil is made of thermoplastic material, thus it is mouldable. The foil could be deep drawn over a rapid prototype or a master and it could have dimensionally influencing properties. The foil can also have multiple functions integrated for the proposed process, e.g. release properties, integrated coating and integrated surface master. Also resin gatings can be integrated in the foil.

The moulding box is preferably covered by a lid in form of a plaid or a plastics folio in order to allow an infiltration process under pressure.

An automated process could be implemented by arranging a continuous process with automated sand/pellet filling infiltration, sand/pellet recycling and moulding box refeeding.

BRIEF DESCRIPTION OF THE DRAWINGS

Further features that improve the invention are stated in the dependent claims or are shown in more detail below together with the description of both preferred similar methods for producing a FRP with reference to the figures. The following are shown:

FIG. 1 a sequence of schematic manufacturing steps corresponding to the first method, and FIG. 2 a sequence of schematic manufacturing steps corresponding to the second method.

DETAILED DESCRIPTION

According to FIG. 1 an open moulding box 1 will be filled with a free flowing fine-graded moulding material in form of a mould sand (step a). After filling the moulding box 1 and pressing it a prototype 3 of casting will be inserted in the pre-compressed moulding material 2 in order to form a corresponding moulding cavity 4 (step b). After the prototype of casting 3 is removed from the mould cavity 4 (step c) a textile preform 5 is covered by a foil (11) made of thermoplastic material and inserted in the mould cavity 4 (step d). Next, the textile preform 5 will be infiltrated with synthetic resin material 6 which flows via an infiltration conduit 7 of a resin infiltrator device into the mould cavity 4 for infiltration the inserted textile preform 5 (step e). After curing of the resin material 6 the fiber re-enforced plastics casting 9 can be demould from the mould cavity 4 (step f).

According to the twin-jection-process as shown in FIG. 2 at first a free flowing coarse-grained moulding material 2' in form of pellets is filled into the open moulding box 1 (step a'). In order to form a moulding cavity 4 a textile preform 5 is directly inserted into the moulding material 2' (step b'). After inserting the textile preform 5 in the moulding material 2' an infiltration conduit 7' of a high viscosity resin infiltrator device 8' will be connected to the moulding material 2' in order to infiltrate the moulding material 2' with high viscosity synthetic resin material which is provided with a viscosity that is such high that the synthetic resin material 8' cannot infiltrate the textile preform 5 (step c'). During the infiltration process the moulding box 1 is covered by a lid 10 in form of a plaid.

After curing the high viscosity synthetic resin material 6' together with the enclosed moulding material 2' an infiltration conduit 7" of a low viscosity resin infiltrator device 8" will be connected to the mould cavity 4 for infiltrating the textile preform 5 with low viscosity synthetic resin material 6" (step d').

After curing of the low viscosity resin material 6" the FRP will be demould from the mould cavity 4 by removing the cured moulding material 2' from the plastics casting 9.

In addition, let it be noted that "encompass" does not preclude any other elements or steps, and "an" or "a" do not rule out a plurality. Let it further be noted that the features or steps described with reference to one of the above exemplary embodiments can also be used in combination with other features or steps of other exemplary embodiments described above. References in the claims are not to be construed as a limitation.

REFERENCE SIGNS 1 moulding box
2 moulding material
3 prototype of casting
4 mould cavity
5 textile preform
6 synthetic resin material
7 infiltration conduit
8 resin infiltrator device
9 plastics casting
10 lid
11 cover foil

The invention claimed is:

1. A method for producing a fiber-reinforced plastics casting, comprising:
    filling an open moulding box with a free flowing moulding material comprising particles;
    compressing the free flowing moulding material in the moulding box to form a precompressed moulding material;
    inserting a prototype of casting in the precompressed moulding material to form a mould cavity;
    removing the prototype of casting from the mould cavity and inserting a textile preform in the mould cavity;
    filling the moulding box with more free flowing moulding material to completely cover the moulding cavity and surround the textile preform;
    infiltrating the textile preform with synthetic resin material to form a fiber-reinforced plastics casting (FRP);
    curing the resin material; and
    demoulding the plastics casting after curing of the resin material.

2. The method according to claim 1, wherein after inserting a textile preform in the mould cavity, the method further comprises connecting an infiltration conduit of a resin infiltrator device to the mould cavity for infiltrating the textile preform with synthetic resin material.

3. The method according to claim 1, comprising manufacturing the prototype of casting by a rapid prototyping process.

4. A method for producing a fiber-reinforced plastics casting, comprising:
   filling an open moulding box with a free flowing moulding material comprising pellets;
   inserting a textile preform in the moulding material to form a moulding cavity;
   infiltrating the moulding material with high viscosity synthetic resin material to form a durable mould and curing the high viscosity resin material;
   infiltrating the textile preform with low viscosity synthetic resin material to form a fiber-reinforced plastics casting (FRP);
   curing the low viscosity resin material; and
   demoulding the cured moulding material after curing of the low viscosity resin material to separate the plastics casting.

5. The method according to claim 4, wherein after inserting a textile preform in the moulding material, the method further comprises connecting an infiltration conduit of a high viscosity resin infiltrator device for infiltrating the moulding material with high viscosity synthetic resin material.

6. The method according to claim 4, wherein after curing the resin material enclosing the moulding material, the method further comprises connecting an infiltration conduit of a low viscosity resin infiltrator device to the mould cavity for infiltrating the textile preform with low viscosity synthetic resin material.

7. The method according to claim 4, wherein the textile preform is embedded in a cover foil made of thermoplastic material.

8. The method according to claim 4, wherein the flow resistance of the textile preform prevents flow of the high viscosity resin material into the textile preform.

* * * * *